United States Patent
Smith

(10) Patent No.: US 6,768,290 B1
(45) Date of Patent: Jul. 27, 2004

(54) SOFT START BATTERY CHARGING SAFETY CIRCUIT

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/292,994

(22) Filed: Nov. 13, 2002

Related U.S. Application Data

(63) Continuation-in-part of application No. 10/155,374, filed on May 22, 2002.

(51) Int. Cl.[7] .................................................. H02J 7/00
(52) U.S. Cl. ........................................................ 320/135
(58) Field of Search .............................. 320/135, 136, 320/134, 137, 127; 307/108, 110; 361/18, 55, 56, 127

(56) References Cited

U.S. PATENT DOCUMENTS 6,570,746 B1 * 5/2003 Smith .......................... 320/127
6,573,767 B1 * 6/2003 Caldwell ..................... 327/143

* cited by examiner

*Primary Examiner*—Pia Tibbits
(74) *Attorney, Agent, or Firm*—Mark R. Hennings; Merchant & Gould

(57) ABSTRACT

A circuit limits a current that is initially discharged from a battery through a battery protection circuit. The current may be discharged through safety circuitry that monitors voltage slew rates and/or voltage levels. The safety circuitry may shunt current to a voltage reference (such as ground) in response to detection of a voltage that exceeds selected parameters. The shunted current may undesirably cause power to be discharged from the battery that is to be charged. A resistive path from the battery to a charger input node is formed when a voltage that is sufficient for charging a battery is detected. A charging signal also is provided in response to the detection of the voltage. A second path that has substantially no resistance is formed between the detected voltage and the battery when the charging signal attains a voltage that is suitable for charging the battery.

15 Claims, 5 Drawing Sheets

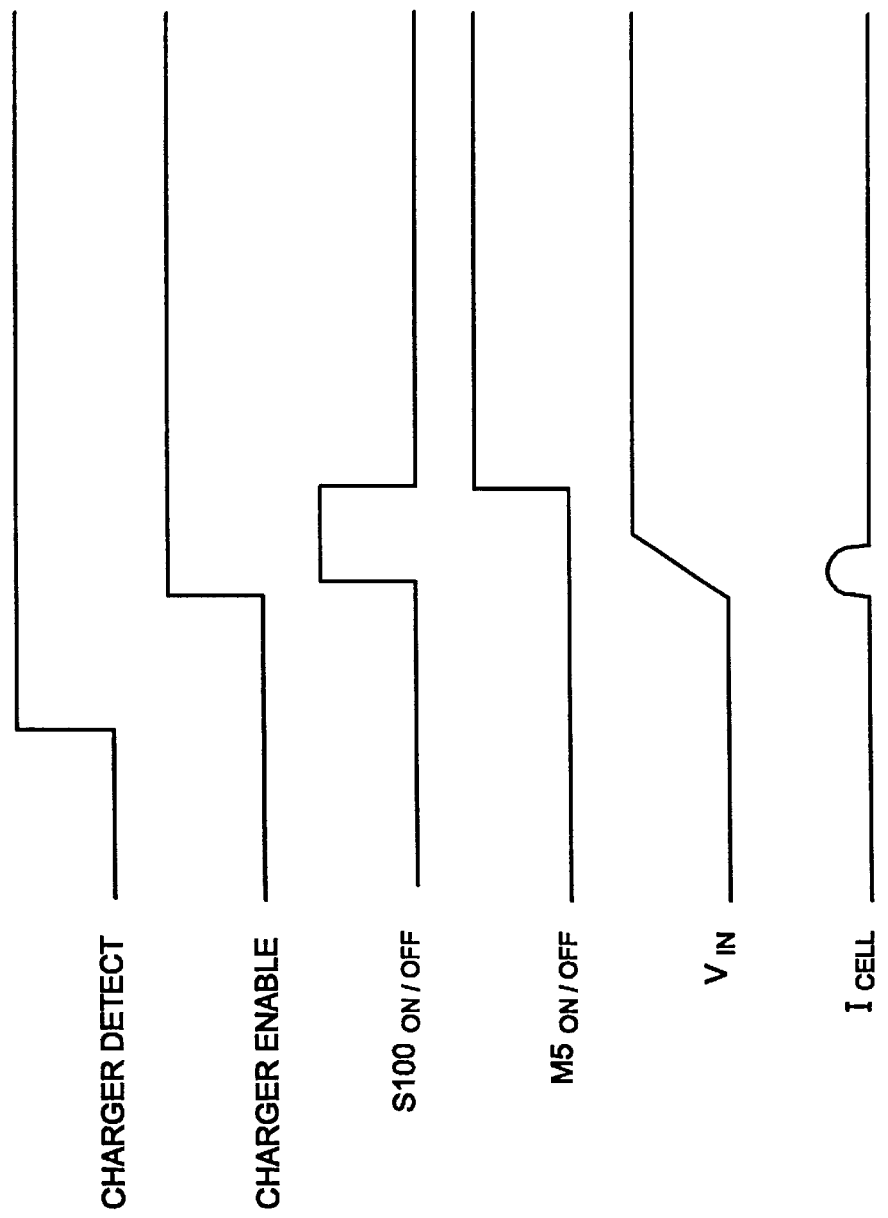

SOFT START BATTERY CHARGING SAFETY CIRCUIT

RELATED APPLICATIONS

This utility patent application is a continuation-in-part of U.S. patent application Ser. No. 10/155,374, filed May 22, 2002, of which the benefit of the earlier filing date is hereby claimed under 35 U.S.C. §120, and which is hereby incorporated by reference.

FIELD OF THE INVENTION

The present invention relates generally to charging circuits for rechargeable batteries, and more particularly to a circuit for limiting undesirable current discharge from a battery during startup of a battery charging circuit.

BACKGROUND OF THE INVENTION

Many portable electronic devices use a rechargeable battery as a power source. Example portable electronic devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller and lighter than other rechargeable battery types with increased charge capacity.

The charging of lithium ion batteries is conducted in a different manner than the charging of nickel type rechargeable batteries. Generally, nickel-type rechargeable batteries are charged by applying a constant current from a battery charger to the battery until the cell reaches a predetermined voltage or temperature. A lithium ion cell, however, uses a different charging process. First, the lithium ion cell is supplied with a current from a battery charger until the cell's voltage rises above a threshold. Next, the battery charger is held at the threshold until the current of the cell decreases to a predetermined level. Damage to at least the battery or battery charger may occur when a battery charger applies an improper voltage to a rechargeable cell.

SUMMARY OF THE INVENTION

The present invention is directed to a circuit for limiting a current that is initially discharged from a battery through a battery protection circuit. A resistive path from the battery to the detected voltage is formed when a voltage that is sufficient for charging a battery is detected. A charging signal also is provided in response to the detection of the voltage. A second path that has substantially no resistance is formed between the detected voltage and the battery when the charging signal attains a voltage that is suitable for charging the battery.

According to one aspect of the invention, a circuit for limiting a current that is initially discharged from a battery through a battery protection circuit is provided. The circuit comprises a controller, a first switch, a charging circuit, and a second switch. The controller is configured to detect the presence of a first voltage that is suitable for powering a charging circuit for the battery. The first switch is configured to couple a resistive path from the first voltage to the battery in response to the detection of the first voltage. The charging circuit is configured to provide a charging signal in response to the detection of the first voltage. The second switch is configured to couple the first voltage to the battery via a path that has substantially no resistance in response to the charging signal attaining a second voltage that is suitable for charging the battery.

According to another aspect of the invention, a method for limiting a current that is initially discharged from a battery through a battery protection circuit comprises detecting the presence of a first voltage that is suitable for powering a charging circuit for the battery. A resistive path is coupled from the first voltage to the battery in response to the detection of the first voltage. The charging circuit is enabled in response to the detection of the first voltage. The first voltage is coupled to the battery via a path that has substantially no resistance in response to a charging signal from the charging circuit attaining a second voltage that is suitable for charging the battery.

A more complete appreciation of the present invention and its improvements can be obtained by reference to the accompanying drawings, which are briefly summarized below, to the following detailed description of illustrated embodiments of the invention, and to the appended claims.

BRIEF DESCRIPTION OF THE DRAWINGS

FIG. 5 is a graph demonstrating the operation of an alternative example battery charging safety circuit in accordance with the present invention.

DETAILED DESCRIPTION OF THE PREFERRED EMBODIMENT

Figure 1:
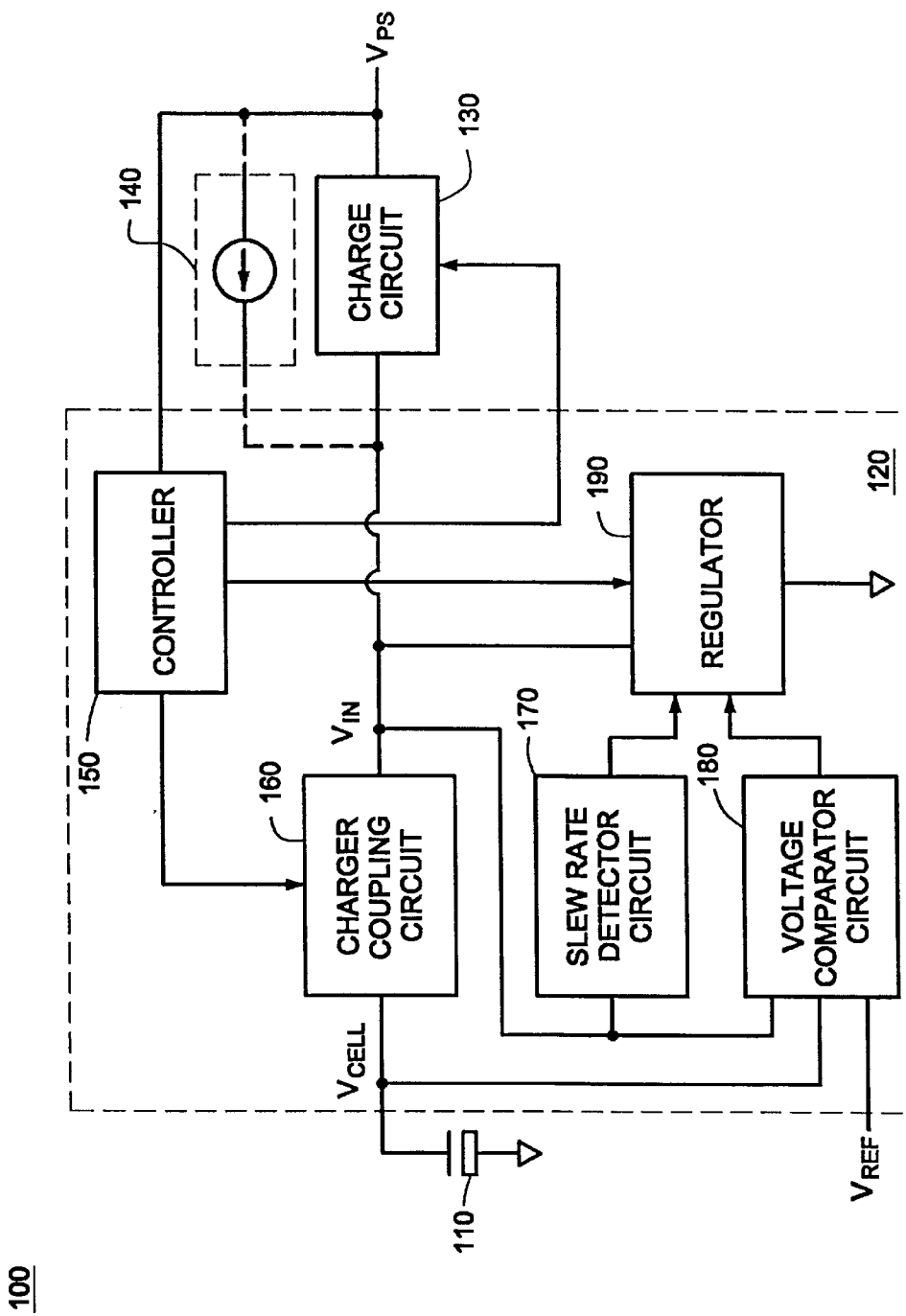
FIG. 1 is an overview schematic of an example battery charging safety circuit system in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "battery" includes single cell batteries and multiple cell batteries. Referring to the drawings, like numbers indicate like parts throughout the views.

The present invention is directed to a circuit for limiting a current that is initially discharged from a battery through a battery protection circuit. The current may be discharged through safety circuitry that monitors voltage slew rates and/or voltage levels. The safety circuitry may shunt current to a voltage reference (such as ground) in response to detection of a voltage (or current) that exceeds selected parameters. The shunted current may undesirably cause power to be discharged from the battery that is to be charged. A resistive path from the battery to the detected voltage is formed when a voltage that is sufficient for charging a battery is detected. A charging signal also is provided in response to the detection of the voltage. A second path that has substantially no resistance is formed between the detected voltage and the battery when the charging signal attains a voltage that is suitable for charging the battery.

FIG. 1 is an overview schematic of an example battery charging safety circuit system in accordance with the present invention. As shown in the figure, battery charging safety circuit system 100 includes cell 110, battery charging safety circuit 120, charge circuit 130, and an optional fault condition 140. Safety circuit 120 is arranged to protect cell 110 from a fault condition (140), which may be related to charge circuit 130. Fault condition 140 may be any unregulated event that is capable of producing a voltage that is unsafe for cell 110.

According to one embodiment of the invention, cell 110 is a lithium ion cell. The cell, however, may be any type of rechargeable battery cell. For example, according to other embodiments, cell 110 may be nickel cadmium or nickel metal hydride.

Charge circuit 130 is arranged to provide a charging signal at node Vin to cell 110. Charge circuit 130 provides a charging signal that has electrical characteristics that are suitable for charging a particular type of cell. For example, a suitable charging signal for a lithium ion cell has a corresponding voltage of 4.1 volts.

Charge circuit 130 may be characterized as a "compliant" or an "non-compliant" charger. A compliant charger is a charger that provides a charging signal that is suitable for charging a particular cell. A non-compliant charger is a charger that would exceed the tolerances of a particular cell when being charged by the non-compliant charger.

Fault condition 140, if present, may cause damage to cell 110. Fault condition 140 may occur when a non-compliant charger is being used. Additionally, failure of components within charge circuit 130, and/or sources of electrical power outside of system 100 may cause fault condition 140 to occur.

Safety circuit 120 is arranged to protect cell 110 from fault conditions. Safety circuit 120 comprises controller 150, charger coupling circuit 160, slew rate detector circuit 170, voltage comparator circuit 180, and regulator 190.

Controller 150 is arranged to monitor the voltage at node VPS and is arranged to control various aspects of system 100 in response. Controller 150 directs charger coupling circuit 160 to couple node charge from Vin to node Vcell when a suitable voltage is detected at node VPS. Controller 150 directs charger coupling circuit 160 to decouple node Vin from node Vcell when power is removed from node VPS. Decoupling node Vin from node Vcell helps prevent cell 110 from (undesirably) discharging through charge circuit 130. Controller 150 also enables charge circuit 130 such that the charging signal is produced at node Vin for charging cell 110. Controller 150 also monitors a temperature within system 100 and directs regulator 190 to lower the voltage of node Vin for the purpose of reducing power dissipation during an over-temperature condition.

Slew rate detector circuit 170 and voltage comparator circuit 180 are arranged to provide activation signals. The activation signals are used to control regulator 190 such that the voltage at node Vin is maintained below a voltage that is potentially damaging to cell 110. Slew rate detector circuit 170 is arranged to detect when the slew rate of the voltage at node Vin exceeds a certain rate that indicates that the voltage at node Vin may exceed a safe level. Voltage comparator circuit 180 is arranged to provide an activation signal when either the voltage at node Vin or node Vcell exceeds a safe level. Slew rate detector circuit 170 provides a fast response to a likely over-voltage event, whereas voltage comparator circuit 180 provides a slower, but steady-state, response to an over-voltage event.

Figure 2:
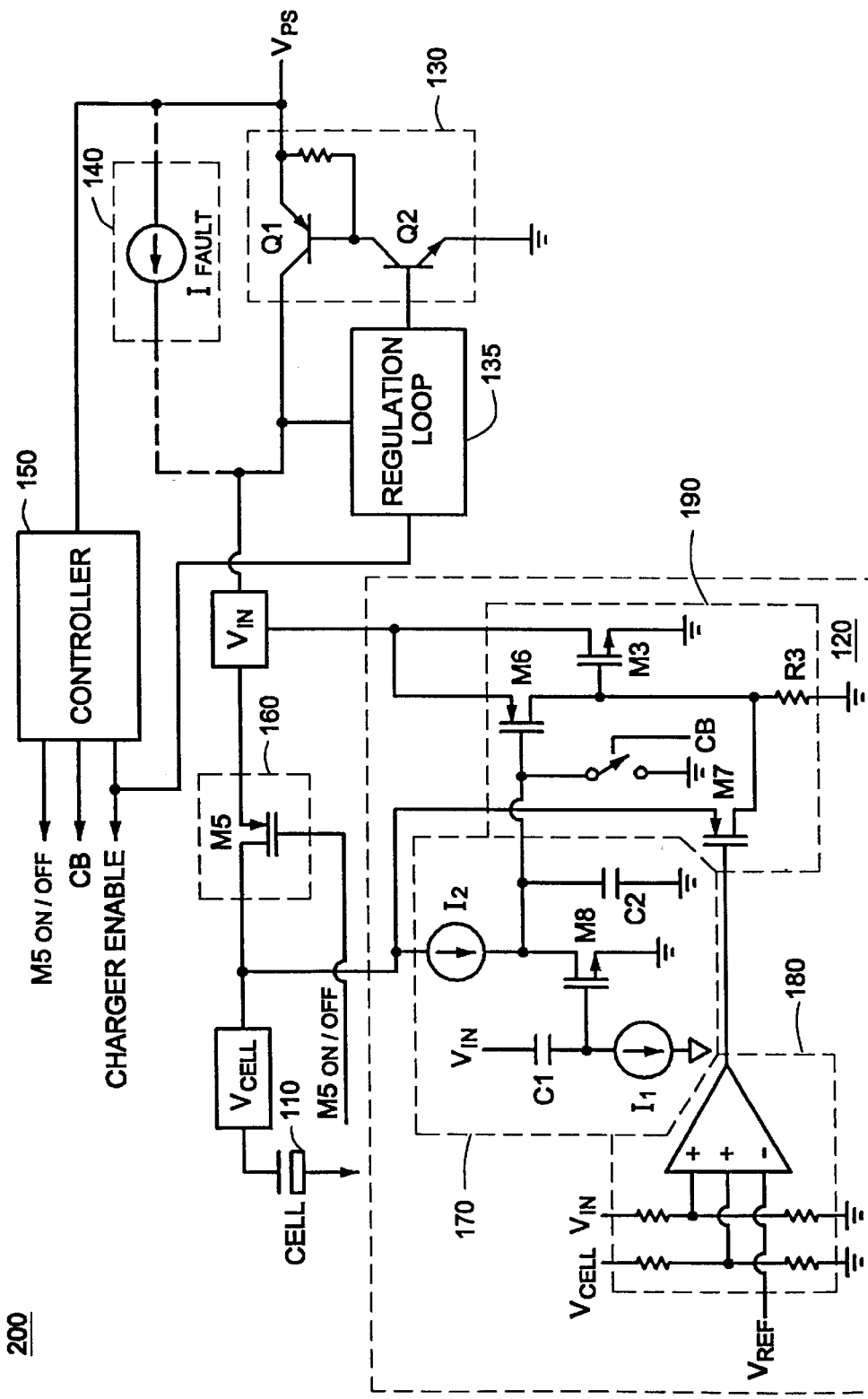
FIG. 2 is a schematic diagram of an example battery charging safety circuit for a rechargeable battery in accordance with the present invention.

FIG. 2 shows schematic diagram of an example battery charging safety circuit 120 for a rechargeable battery in accordance with the present invention. Battery charging safety circuit 120 includes controller 150, charger voltage coupling circuit 160, voltage amplifier circuit 180, slew rate detection circuit 170, and regulator 190.

Controller 150 detects the presence of a voltage at node VPS. Controller 150 asserts signal CHARGER DETECT when a suitable voltage is detected. Controller 150 asserts signals CHARGER ENABLE and M5on/off after the voltage at node VPS has been "debounced." Signal CHARGER ENABLE enables a regulation loop (135) that is used to control charging circuit 130. Signal M5on/off couples the detected power supply voltage to node Vcell for charging cell 110.

Controller 150 is also configured to detect an over-temperature condition within a portion of charge circuit 120. The over-temperature condition may occur as a result of switch M3 regulating a safety voltage. Switch CB of regulator 190 is closed in response to the over-temperature condition. Control transistor M6 couples the voltage at node Vin to the gate of transistor M3 (which is arranged within a power amplifier) when switch CB is closed. Shunt transistor M3 conducts such that the voltage at node Vin decreases when the voltage at the gate of transistor M3 exceeds its gate threshold voltage. Decreasing the voltage at node Vin reduces the power dissipation of shunt transistor M3 during an over-temperature condition.

Charging circuit 130 is a simplified representation of a voltage regulation circuit for charging cell 110. Transistor Q1 regulates the charging current for cell 110. Transistor Q2 operates in response to a regulation loop (135) that is activated by the CHARGER ENABLE signal provided by controller 150. Transistor Q2, in turn, is arranged to regulate transistor Q1. A charging signal that is suitable for cell 110 is provided by transistor Q1. The charging signal initially slews high at a rapid rate ("high slew rate") when power is applied to system 200. After the desired charging voltage for a particular cell has been reached, charging circuit 130 is reaches steady-state operation. Charging circuit in steady-state operation maintains the desired charging voltage at a stable level with a relatively low slew rate.

A fault condition may occur whenever transistor Q1 is "leaky," shorted out, or otherwise deficient. The fault condition may include an unregulated current (shown as current source IFAULT 140) being provided to cell 110. If the fault condition raises the voltage at node Vin at a slow rate, voltage amplifier circuit 180 and regulator 190 will limit the voltage at node Vin to a safe level. If the voltage at node Vin rises at a fast rate, slew rate detector circuit 170 and regulator 190 will lower the voltage at node Vin to a safe level. The relatively high slew rate of the signal at node Vin causes slew rate detector circuit 170 to trigger when the fault condition occurs. Slew rate detector circuit 170 triggers upon detecting a relatively high slew rate (trigger slew rate).

A trigger slew rate is selected to be higher than the relatively low slew rate expected of a stable charging circuit. However, the trigger slew rate should be cautiously selected. If the selected trigger slew rate is too high, a fault condition having an intermediate slew rate may produce a dangerous voltage before voltage amplifier circuit 180 and regulator 190 can respond. Thus, the trigger slew rate is also determined by the response time of voltage amplifier circuit 180 and regulator 190 can respond and by the desired charging voltage.

Charging circuit 130 is a simplified representation of a voltage regulation circuit for charging cell 110. Transistor Q1 regulates the charging current for cell 110. Transistor Q2 operates in response to a regulation loop (135) that is activated by the CHARGER ENABLE signal provided by controller 150. Transistor Q2, in turn, is arranged to regulate transistor Q1. A charging signal that is suitable for cell 100 is provided by transistor Q1. The charging signal initially slews high at a rapid rate ("high slew rate") when power is applied to system 200. After the desired charging voltage for a particular cell has been reached, charging circuit 130 reaches steady-state operation. Charging circuit in steady-state operation maintains the desired charging voltage at a stable level with a relatively low slew rate.

Slew rate detection circuit 170 is used to quickly lower the voltage of node Vin whenever the slew rate of the voltage at node Vin exceeds a certain rate. The maximum slew rate threshold is selected to exclude slew rates encountered in unstable situations where damage from over-voltages to cell 110 or safety circuit 120 could occur. Unstable situations may occur, for example, when initially applying power to node Vin, or when the voltage at node Vin may fluctuate more rapidly than voltage amplifier circuit 180 and regulator 190 can compensate. Capacitor C1 and current source I1 cooperate to determine when the maximum threshold slew rate has been exceeded and to activate transistor M8 in response. Transistor M8 is arranged to turn on control transistor M6, which in turn activates shunt transistor M3. Capacitor C2 and current source I2 cooperate to maintain the length of time that control transistor M6 is activated. The control transistor (M6) activation time is chosen to be long enough (e.g., 100$\mu$sec.) to allow sufficient response time for voltage amplifier circuit 180 to also activate shunt transistor M3

In operation, slew rate detection circuit 170 provides an activation signal that turns on transistor M8 whenever the slew rate at node Vin exceeds the maximum slew rate (e.g., 5000 volts per second). Feed-forward capacitor C1 causes the voltage to rise at the gate of transistor M8 when the slew rate of the voltage at Vin exceeds the maximum slew rate. The gate voltage floats high enough such that transistor M8 conducts. Current source I1 is arranged to remove the charge of the gate of transistor M8 at a predetermined rate to turn off transistor M8. The maximum slew rate threshold can be set by choosing an appropriate value for feed-forward capacitor C1 and current for current source I1.

Current source I2 is provided to charge capacitor C2 when a voltage is present at node Vcell. Transistor M8 is configured to discharge capacitor C2 when the maximum slew rate threshold is exceeded. In the initial period after capacitor C2 has been discharged, the voltage on the gate of transistor M6 drops low enough such that control transistor M6 conducts. (The magnitude of the control transistor VGS—with respect to the transistor source—increases above the transistor conduction threshold, which establishes a conduction channel.) After transistor M8 has been turned off, current from current source I2 eventually charges capacitor C2 to such a degree where control transistor M6 is turned off.

Control transistor M6 also provides the activation signal in response to an effect upon the source of transistor M6 by an increase in the voltage at node Vin. An IR drop is formed across transistor M5 in response to current carried through transistor M5. An appreciable voltage drop across transistor M5 is formed when a current fault 140 exists. In response to the IR drop, the voltage at node Vin rises to a level above the voltage at node Vcell (which is the compliance point of current source I2, discussed above). The rise in the voltage at node Vin establishes a voltage at the source of transistor M6 that is above the gate voltage of transistor M6. A conduction channel is formed in transistor M6 when the magnitude of the VGS (i.e, with respect to the source) increases beyond the conduction threshold of transistor M6. The establishment of the conduction channel permits the activation signal to be asserted. When the activation signal activates shunt transistor M3, the voltage rise at node Vin is reduced accordingly. The slew rate detection circuit and the voltage amplifier circuit may operate to maintain regulation (if necessary) after the initial source-based regulation has ended.

The increase in the voltage at node Vin (which forms an IR drop across transistor M5) may be caused in response to a variety of fault conditions. Fault conditions may arise in a wide range of conditions that singly or in combination operate to create a scenario in which damage to cell 110 or the battery charger protection circuit 120 may occur. For example, a fault condition may arise when a missing or deeply discharged cell is provided, which would not typically provide sufficient power to fully enable battery charger protection circuit 120. Likewise, a failure of the temperature protection circuit could cause the temperature of the battery charger protection circuit 120 to rise to a level above which, for example, an amplifier would not function. Additionally, a fault condition that occurs when node Vin is already high (e.g., 5 volts) may not produce a slew rate in the voltage at node Vin that is sufficient to trigger a slew rate detection circuit. The example battery charger protection circuit 120 may protect itself during these (and other) scenarios by activating shunt transistor M3 in response to sensing the IR drop formed across transistor M5.

Figure 3:
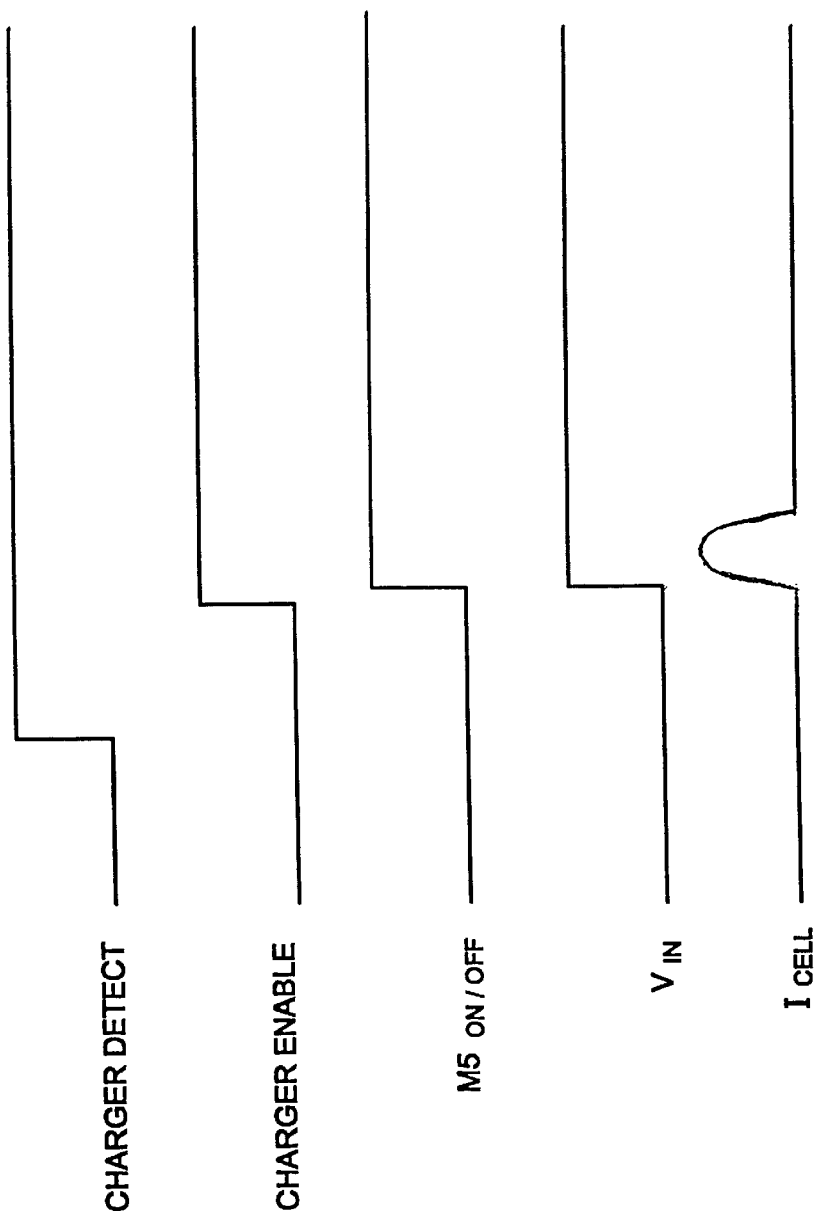
FIG. 3 is a graph demonstrating the operation of the example battery charging safety circuit in accordance with the present invention.

FIG. 3 is a graph demonstrating the operation of the example battery charging safety circuit in accordance with the present invention. Controller 150 detects the presence of a voltage at node VPS. Controller 150 asserts signal CHARGER DETECT when a suitable voltage is detected. After a period suitable for "debouncing" (e.g., 32 milliseconds) the applied voltage at node VPS, controller 150 asserts signals CHARGER ENABLE and M5on/off. Signal CHARGER ENABLE directs charge circuit 130 to provide a charging signal at node Vin. Signal M5on/off directs charger coupling circuit 160 to couple node Vin to node Vcell through transistor M5. Charge circuit 130 provides a charging signal at node Vin that is suitable for charging cell 110 in response to the assertion of signal CHARGER ENABLE. Slew rate detector circuit 170 applies an activation signal to regulator 190 in response to the rapid slew rate of the application of the charging signal. In response to the activation signal, transistor M3 of regulator 190 opens, which opens a path for current to flow from cell 110 through transistor M5 (which "pulls up" node Vin) through transistor M3 to ground. The current from cell 110 (ICELL) may reach one ampere during the period of time in which charge circuit 130 can maintain a sufficiently high slew rate of the charging signal at node Vin. As the slew rate decreases and a stable charging signal is achieved, slew rate detector circuit 170 removes the activation signal from regulator 190. In response to the removal of the activation signal, transistor M3 shuts off, which breaks the path to ground for current from cell 110.

Figure 4:
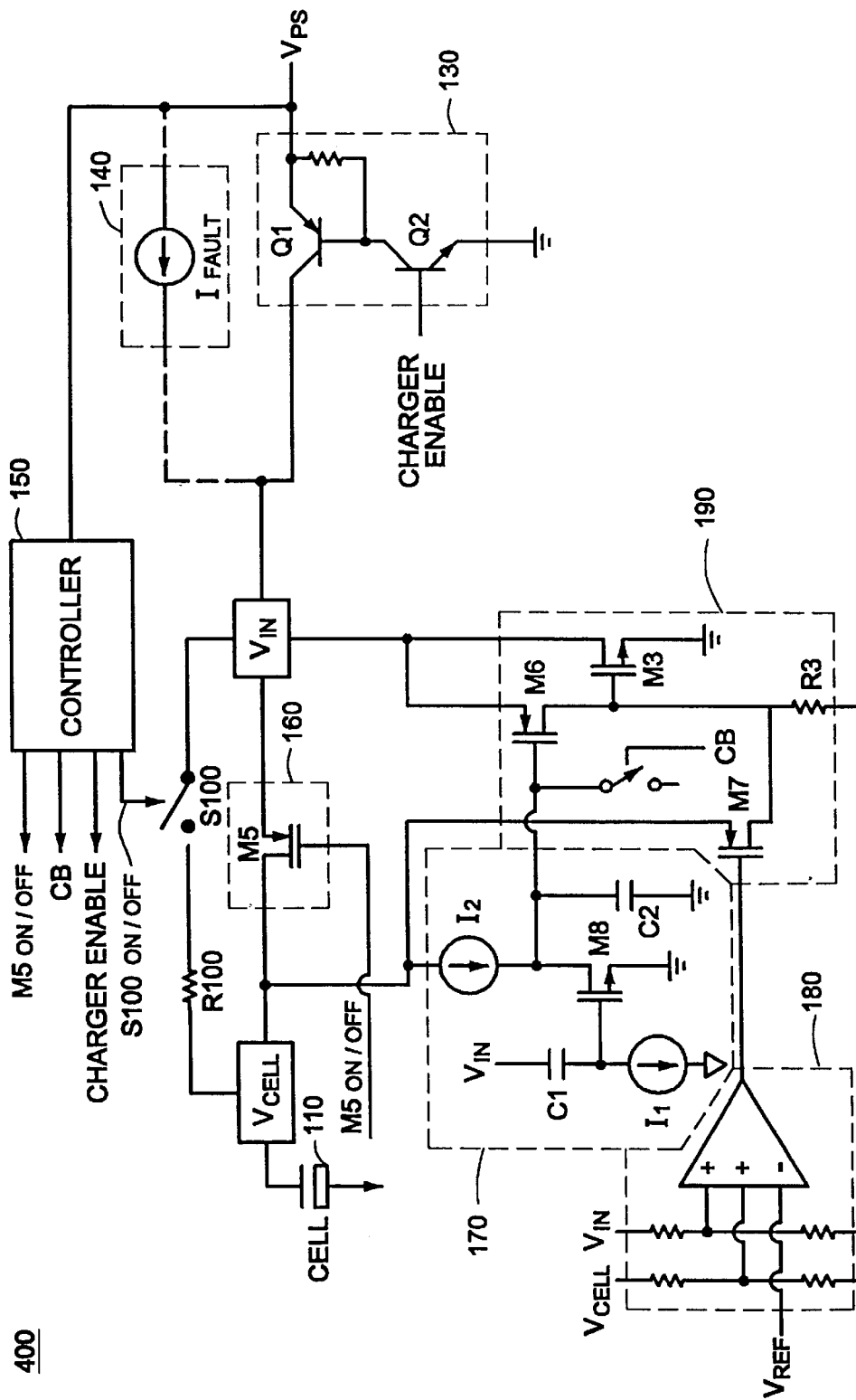
FIG. 4 is a schematic diagram of an alternative example battery charging safety circuit for a rechargeable battery in accordance with the present invention.

FIG. 4 is a schematic diagram of an alternative example battery charging safety circuit that is arranged in accordance with the present invention. The circuit (400) of FIG. 4 is similar to the circuit (200) of FIG. 2, albeit different in significant ways. Controller 150 also includes resistor R100 and switch S100 that are coupled in series between node Vin and node Vcell. Controller 150 is coupled to the control terminal of switch S100.

Resistor R100 and switch S100 are configured to provide an alternate path (instead of through transistor M5) through which current from cell 110 can flow to pull up node Vin during safety circuit startup. During safety circuit startup, controller 150 maintains transistor M5 in its "off" state and closes switch S100. Resistor R100 limits the current from cell 110 that flows to ground as transistor M3 turns on in response to an excessive slew rate at node Vin. This results in a gentler current spike from cell 110 that would have otherwise occurred if the current had been allowed to flow unimpeded through transistor M5. (The current path through transistor M5 contains no current limiting resistor.) This also results in avoiding the situation where both transistors M3 and M5 are "on" and pull the voltage at node Vcell below the power-on reset threshold, which may undesirably result in an oscillation of the safety circuitry during startup. When the voltage at node Vin reaches a desired charging level, controller 150 opens switch S100 and activates transistor M5. The operation of the configuration of resistor R100 and switch S100 in circuit 400 is more fully described below with respect to FIG. 5.

FIG. 5 is a graph demonstrating the operation of an alternative example battery charging safety circuit in accordance with the present invention. Controller 150 detects the presence of a voltage at node VPS. Controller 150 asserts signal CHARGER DETECT when a suitable voltage is detected. After a period suitable for "debouncing" (e.g., 32 milliseconds) the applied voltage at node VPS, controller 150 asserts signals CHARGER ENABLE and S100on/off. Signal CHARGER ENABLE directs charge circuit 130 to provide a charging signal at node Vin. In response to the assertion of signal CHARGER ENABLE, charge circuit 130 provides (after an actuation delay) a charging signal at node Vin that is suitable for charging cell 110. The slew rate of the voltage at node Vin is limited by resistor R100, but not so greatly as to prevent slew rate detector circuit 170 from triggering. (Transistor M3 still conducts, but is current limited by resistor R100.) Slew rate detector circuit 170 applies an activation signal to regulator 190 in response to the rapid slew rate of the voltage at node Vin. In response to the activation signal, transistor M3 of regulator 190 conducts, which establishes a path to ground for current from cell 110 through switch S100. The current from cell 110 (ICELL) may reach 40 mA where resistor R100 is 20 ohms. Slew rate detector circuit 170 removes the activation signal from regulator 190 as the slew rate decreases and a stable charging signal is achieved. In response to the removal of the activation signal, transistor M3 shuts off, which breaks the path to ground for current from cell 110. When the voltage at node Vin reaches a desired charging level, controller 150 opens switch S100 (by de-asserting signal S100on/off) and activates transistor M5 (by asserting signal M5on/off). Signal M5on/off directs charger coupling circuit 160 to couple node Vin to node Vcell through transistor M5.

The above specification, examples and data provide a complete description of the manufacture and use of the composition of the invention. Since many embodiments of the invention can be made without departing from the spirit and scope of the invention, the invention resides in the claims hereinafter appended.

I claim:

1. a circuit for limiting a current that is initially discharged from a battery through a battery protection circuit, comprising:
   a controller that is configured to detect the presence of a first voltage that is suitable for powering a charging circuit for the battery;
   a first switch that is configured to couple a resistive path from a second voltage to the battery in response to the detection of the first voltage;
   a charging circuit that is configured to provide a charging signal in response to the detection of the first voltage; and
   a second switch that is configured to couple the first voltage to the battery via a path that has substantially no resistance in response to the charging signal.

2. The circuit of claim 1, wherein the first switch is further configured to couple the resistive path in response to the detection of the first voltage and in response to a passage of a period of time that is suitable for debouncing the second voltage.

3. The circuit of claim 1, wherein the first switch is further configured to decouple the resistive path of the first voltage to the battery in response to the charging signal.

4. The circuit of claim 1, further comprising a slew rate detector that is configured to detect when a slew rate of the charging signal exceeds a maximum expected slew rate of a stable charging circuit.

5. The circuit of claim 4, further comprising a safety circuit that is configured to shunt current through the battery protection circuit in response to the detection of the charging signal exceeding the maximum expected slew rate.

6. A method for limiting a current that is initially discharged from a battery through a battery protection circuit, comprising:
   detecting the presence of a first voltage that is suitable for powering a charging circuit for the battery;
   coupling a resistive path from a second voltage to the battery in response to the detection of the first voltage;
   enabling the charging circuit in response to the detection of the first voltage; and
   coupling the first voltage to the battery via a path that has substantially no resistance in response to a charging signal from the charging circuit.

7. The method of claim 6, wherein the resistive path is coupled in response to the detection of the first voltage and in response to a passage of a period of time that is suitable for debouncing the second voltage.

8. The method of claim 6, further comprising decoupling the resistive path of the second voltage to the battery in response to the charging signal.

9. The method of claim 6, further comprising detecting when a slew rate of the charging signal exceeds a maximum expected slew rate of a stable charging circuit.

10. The method of claim 9, further comprising shunting current through the battery protection circuit in response to the detection of the charging signal exceeding the maximum expected slew rate.

11. A circuit for limiting a current that is initially discharged from a battery through a battery protection circuit, comprising:

means for detecting the presence of a first voltage that is suitable for powering a charging circuit for the battery;

means for coupling a resistive path from a second voltage to the battery in response to the detection of the first voltage;

means for enabling the charging circuit in response to the detection of the first voltage; and means for coupling the first voltage to the battery via a path that has substantially no resistance in response to a charging signal from the charging circuit.

12. The circuit of claim 11, wherein the means for coupling the resistive path couples the resistive path in response to the detection of the first voltage and in response to a passage of a period of time that is suitable for debouncing the second voltage.

13. The circuit of claim 11, further comprising means for decoupling the resistive path of the second voltage to the battery in response to the charging signal.

14. The method of claim 11, further comprising means for detecting when a slew rate of the charging signal exceeds a maximum expected slew rate of a stable charging circuit.

15. The method of claim 14, further comprising means for shunting current through the battery protection circuit in response to the detection of the charging signal exceeding the maximum expected slew rate.

\* \* \* \* \*

UNITED STATES PATENT AND TRADEMARK OFFICE
CERTIFICATE OF CORRECTION

PATENT NO. : 6,768,290 B1
DATED : July 27, 2004
INVENTOR(S) : Gregory J. Smith

It is certified that error appears in the above-identified patent and that said Letters Patent is hereby corrected as shown below:

Column 5,
Lines 18-32, insert the following paragraph:

-- Voltage amplifier circuit 180 causes regulator 190 to lower the voltage of node Vin whenever the voltage at node Vin or the voltage at node Vcell exceeds a safe voltage for charging cell 110. In an example embodiment, the voltage at node Vin is received by a first voltage divider having a center tap. The center tap voltage of the first voltage divider is compared to a safety reference voltage. Likewise, the voltage at node Vcell is received by a second voltage divider having a second center tap. The center tap voltage of the second voltage divider is compared to the safety reference voltage. When the safety reference voltage is exceeded by either of the center tap voltages, the amplifier asserts an activation signal, which activates transistor M7. When transistor M7 is activated, the voltage at node Vcell is coupled to the gate of shunt transistor M3. When the voltage at node Vcell is above the gate threshold of shunt transistor M3, shunt transistor M3 shunts current from node Vin to ground such that the voltage at node Vin decreases. --.

Column 3,
Line 42, change "an" to -- a --.

Column 5,
Line 46, change "12" to -- I2 --.

UNITED STATES PATENT AND TRADEMARK OFFICE
CERTIFICATE OF CORRECTION

PATENT NO. : 6,768,290 B1
DATED : July 27, 2004
INVENTOR(S) : Gregory J. Smith

It is certified that error appears in the above-identified patent and that said Letters Patent is hereby corrected as shown below:

Column 6,
Line 18, change "12" to -- I2 --.

Column 8,
Line 15, change "a", first occurrence, to -- A --.

Signed and Sealed this

Sixth Day of June, 2006

JON W. DUDAS
*Director of the United States Patent and Trademark Office*